US010748299B2

United States Patent
Ludhiyani et al.

(10) Patent No.: US 10,748,299 B2
(45) Date of Patent: Aug. 18, 2020

(54) SYSTEM AND METHOD OF MULTIROTOR DYNAMICS BASED ONLINE SCALE ESTIMATION FOR MONOCULAR VISION

(71) Applicant: Tata Consultancy Services Limited, Mumbai (IN)

(72) Inventors: Mohit Ludhiyani, Kolkata (IN); Vishvendra Rustagi, Kolkata (IN); Arnab Sinha, Kolkata (IN); Ranjan Dasgupta, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/580,403

(22) Filed: Sep. 24, 2019

(65) Prior Publication Data

US 2020/0098129 A1    Mar. 26, 2020

(30) Foreign Application Priority Data

Sep. 24, 2018   (IN) .............................. 201821035845

(51) Int. Cl.
*G06T 7/20*    (2017.01)
*G06T 7/70*    (2017.01)
(Continued)

(52) U.S. Cl.
CPC .................. *G06T 7/70* (2017.01); *G01C 3/08* (2013.01); *G06T 7/277* (2017.01); *B64C 39/024* (2013.01)

(58) Field of Classification Search
None
See application file for complete search history.

(56) References Cited

U.S. PATENT DOCUMENTS 9,031,782 B1 *  5/2015  Lemay ................... G01C 21/00
                                                                701/445
9,387,927 B2 *  7/2016  Rischmuller ......... B64C 39/024
(Continued)

FOREIGN PATENT DOCUMENTS

CN       104062977 A      9/2014
CN       206804018 U     12/2017

OTHER PUBLICATIONS

Lee, S.H. et al. "Stability-based Scale Estimation of Monocular SLAM for Autonomous Quadrotor Navigation," Delft University of Technology, Master of Science Thesis, Aug. 21, 2017, 70 pages.
(Continued)

*Primary Examiner* — Christopher G Findley
(74) *Attorney, Agent, or Firm* — Finnegan, Henderson, Farabow, Garrett & Dunner LLP

(57) ABSTRACT

Robotic vision-based framework wherein an on-board camera device is used for scale estimation. Unlike conventional scale estimation methods that require inputs from more than one or more sensors, implementations include a system and method to estimate scale online solely, without any other sensor, for monocular SLAM by using multirotor dynamics model in an extended Kalman filter framework. This approach improves over convention scale estimation methods which require information from some other sensors or knowledge of physical dimension of an object within the camera view. An arbitrary scaled position and an Euler angle of a multirotor are estimated from vision SLAM (simultaneous localization and mapping) technique. Further, dynamically integrating, computed acceleration to estimate a metric position. A scale factor and a parameter associated with the multirotor dynamics model is obtained by comparing the estimated metric position with the estimated arbitrary position.

6 Claims, 7 Drawing Sheets

(51) Int. Cl.
*G06T 7/277* (2017.01)
*G01C 3/08* (2006.01)
*B64C 39/02* (2006.01)

(56) References Cited

U.S. PATENT DOCUMENTS

| | | | |
|---|---|---|---|
| 9,599,993 B2* | 3/2017 | Kumar | G05D 1/104 |
| 2016/0107751 A1* | 4/2016 | D'Andrea | G05D 1/0072 |
| | | | 701/4 |
| 2017/0193830 A1* | 7/2017 | Fragoso | G05D 1/102 |
| 2017/0199528 A1* | 7/2017 | Detweiler | A01M 21/00 |
| 2017/0212529 A1* | 7/2017 | Kumar | G01C 21/165 |
| 2018/0164124 A1* | 6/2018 | Viswanathan | G01C 21/165 |
| 2018/0239353 A1* | 8/2018 | Enke | B64C 39/024 |
| 2019/0031342 A1* | 1/2019 | Mitchell | G01S 17/89 |
| 2019/0051193 A1* | 2/2019 | Gutierrez | G08G 5/0069 |
| 2020/0029490 A1* | 1/2020 | Bertucci | A01B 69/008 |
| 2020/0125100 A1* | 4/2020 | Wu | G06K 9/00664 |

OTHER PUBLICATIONS

Zhang, Z. et al. (2018). "Scale Estimation and Correction of the Monocular Simultaneous Localization and Mapping (SLAM) Based on Fusion of 1D Laser Range Finder and Vision Data," *Sensors*, vol. 18, 17 pages.

* cited by examiner

SYSTEM AND METHOD OF MULTIROTOR DYNAMICS BASED ONLINE SCALE ESTIMATION FOR MONOCULAR VISION

PRIORITY CLAIM

This U.S. patent application claims priority under 35 U.S.C. § 119 to Indian Application No. 201821035845, filed on Sep. 24, 2018. The entire contents of the aforementioned application are incorporated herein by reference.

TECHNICAL FIELD

This disclosure relates generally to multirotors system, and, more particularly, to a system and method for estimating online scale for monocular vision based on multirotor dynamics.

BACKGROUND

In advent of autonomous unmanned aerial vehicle (UAV) such as multirotors has had a strong impact in the robotics field. They have opened new avenues of research and are rapidly being deployed in search and exploration situations which were not accessible through UGVs. Tasks such as constructing 3D structures have now been accomplished through autonomous multirotors. There are lot of commercially available multirotors available in the market, which provide a video feedback using monocular camera. Researchers can easily use structure from motion concepts, to generate a reliable dense structure from these videos. But, the metric scale is absent within this estimation procedure. However, autonomous control requires accurate and frequent estimate of system states such as position and orientation. A number of research works have utilized external motion capture systems, but scaling them outside lab conditions is out of scope. State estimates can be obtained through GPS, but the frequency is low and the error covariance is high. Also, they often fail in an indoor environment due to signal interference.

Another widely used method is robotic vision-based framework wherein an on-board camera device such as a monocular camera or stereo camera is used for state estimation through algorithms such as SLAM, VO. Stereo camera provide accurate state estimates up to scale but incurs a weight penalty. On the other hand, monocular cameras, while being a low cost and low weight solution, are scale agnostic, i.e., they are scaled by an arbitrary factor. With reference to FIG. 1, in order to provide scale information, researchers have fused IMU or altitude sensor data, in metric scale, with the monocular vision sensor. The method for scale estimation in case of a monocular camera is using a metric sensor such as an IMU, Ultrasound beside others. Unlike conventional scale estimation methods that require input from one or more sensors such as an IMU or altitude sensor.

SUMMARY

Embodiments of the present disclosure present technological improvements as solutions to one or more of the above-mentioned technical problems recognized by the inventors in conventional systems. For example, in one aspect, a processor implemented method of estimating online scale for a monocular SLAM is provided. The method comprises estimating, by a monocular camera, an arbitrary scaled position of a multirotor based on a vision SLAM (simultaneous localization and mapping) technique in an inertial frame; inputting, to a multirotor dynamics based prediction module, an Euler angle estimated from the vision SLAM technique to compute an acceleration of the multirotor; dynamically integrating, the computed acceleration to estimate a metric velocity and a metric position; comparing, in a measurement updating module, the estimated metric position with the estimated arbitrary position from the vision SLAM technique; and estimating, a scale factor and a parameter associated with a multirotor dynamics model, wherein the parameter associated with the multirotor dynamics model is a drag coefficient.

In an embodiment, the scale factor may be estimated based on a resultant error occurred during comparison between the estimated metric position with the estimated arbitrary position. The estimated arbitrary scaled position may differ from the estimated metric position by the scale factor.

In another aspect, there is provided a processor implemented system to estimate online scale for a monocular SLAM is provided. The system comprises: a memory storing instructions; one or more communication interfaces; and one or more hardware processors coupled to the memory via the one or more communication interfaces, wherein the one or more hardware processors are configured by the instructions to: estimate, by a monocular camera, an arbitrary scaled position of a multirotor based on a vision SLAM (simultaneous localization and mapping) technique in an inertial frame; input, to a multirotor dynamics based prediction module, an Euler angle estimated from the vision SLAM technique to compute an acceleration of the multirotor; dynamically integrate, the computed acceleration to estimate a metric velocity and a metric position; compare, in a measurement updating module, the estimated metric position with the estimated arbitrary position from the vision SLAM technique; and estimate, a scale factor and a parameter associated with a multirotor dynamics model, wherein the parameter associated with the multirotor dynamics model is a drag coefficient.

In an embodiment, the scale factor may be estimated based on a resultant error occurred during comparison between the estimated metric position with the estimated arbitrary position. The estimated arbitrary scaled position may differ from the estimated metric position by the scale factor.

In yet another aspect, there are provided one or more non-transitory machine readable information storage mediums comprising one or more instructions which when executed by one or more hardware processors causes estimating, by a monocular camera, an arbitrary scaled position of a multirotor based on a vision SLAM (simultaneous localization and mapping) technique in an inertial frame; inputting, to a multirotor dynamics based prediction module, an Euler angle estimated from the vision SLAM technique to compute an acceleration of the multirotor; dynamically integrating, the computed acceleration to estimate a metric velocity and a metric position; comparing, in a measurement updating module, the estimated metric position with the estimated arbitrary position from the vision SLAM technique; and estimating, a scale factor and a parameter associated with a multirotor dynamics model, wherein the parameter associated with the multirotor dynamics model is a drag coefficient.

In an embodiment, the scale factor may be estimated based on a resultant error occurred during comparison between the estimated metric position with the estimated arbitrary position. The estimated arbitrary scaled position may differ from the estimated metric position by the scale factor.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
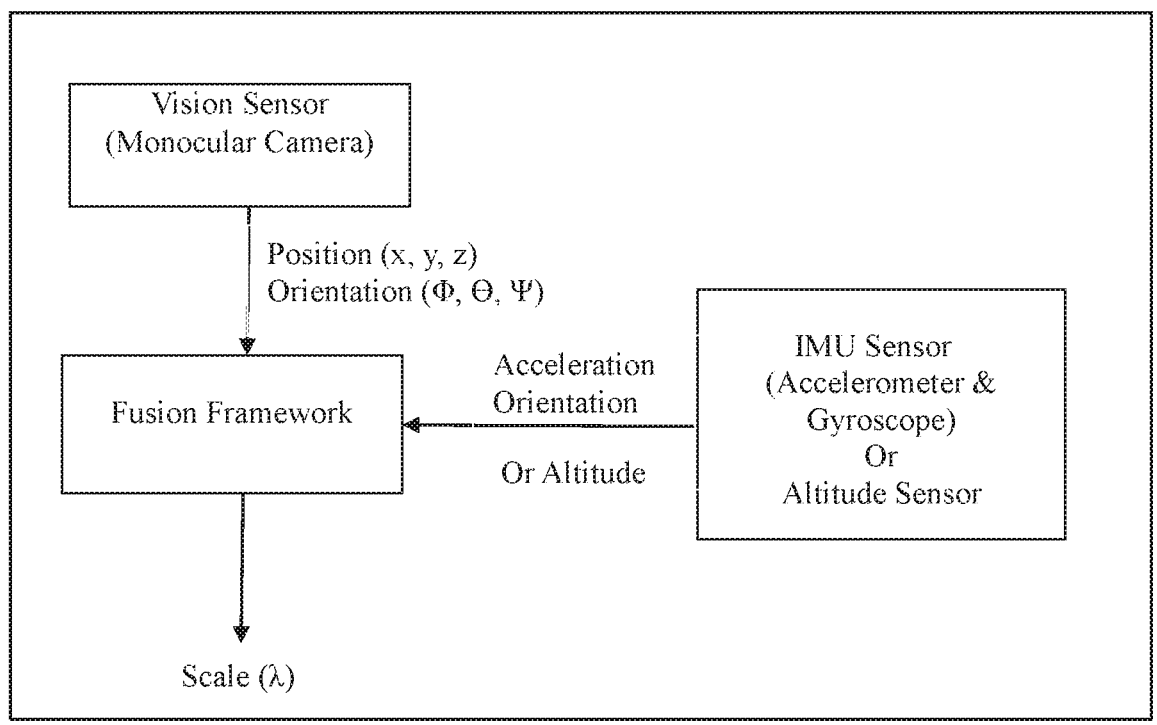
FIG. 1 illustrates a typical approach of fusing vision sensor and IMU sensor in Fusion framework for scale estimation.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 5C, where similar reference characters denote corresponding features consistently throughout the figures, there are shown preferred embodiments and these embodiments are described in the context of the following exemplary system and/or method.

Figure 2:
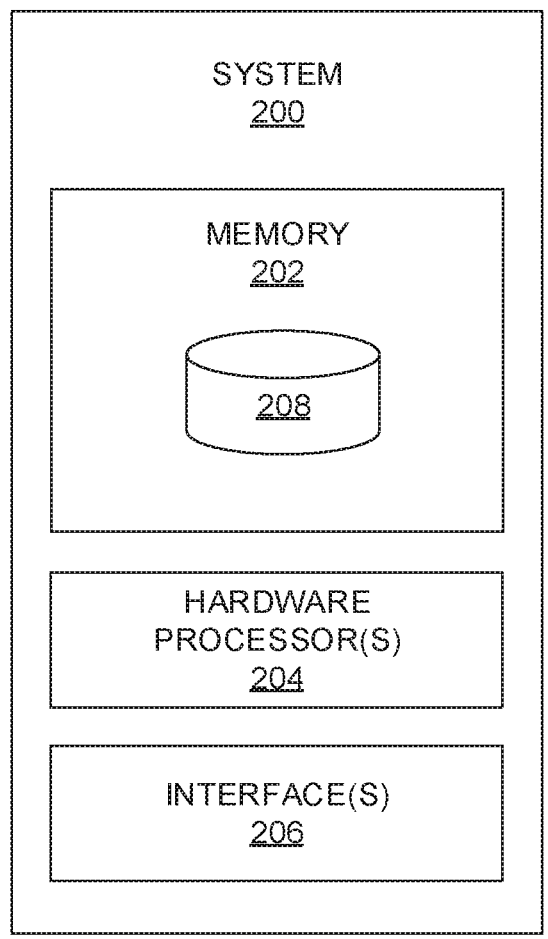
FIG. 2 illustrates a block diagram of a system for estimating online scale for a monocular SLAM (simultaneous localization and mapping) based on multirotor dynamics in accordance with an embodiment of the present disclosure.

FIG. 2 illustrates a block diagram of a system for estimating online scale for a monocular SLAM (simultaneous localization and mapping) based on multirotor dynamics in accordance with an embodiment of the present disclosure. In an embodiment, the system 200 includes one or more processors 204, communication interface device(s) or input/output (I/O) interface(s) 206, and one or more data storage devices or memory 202 operatively coupled to the one or more processors 204. The memory 202 comprises a database 208. The one or more processors 204 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 200 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 208 may store information but are not limited to, a plurality of parameters obtained from one or more sensors, wherein the parameters are specific to an entity (e.g., user, machine, and the like). Parameters may comprise sensor data captured through the sensors either connected to the user and/or machine. Further, the database 208 stores information pertaining to inputs fed to the system 200 and/or outputs generated by the system (e.g., at each stage), specific to the methodology described herein. More specifically, the database 208 stores information being processed at each step of the proposed methodology.

Figure 3:
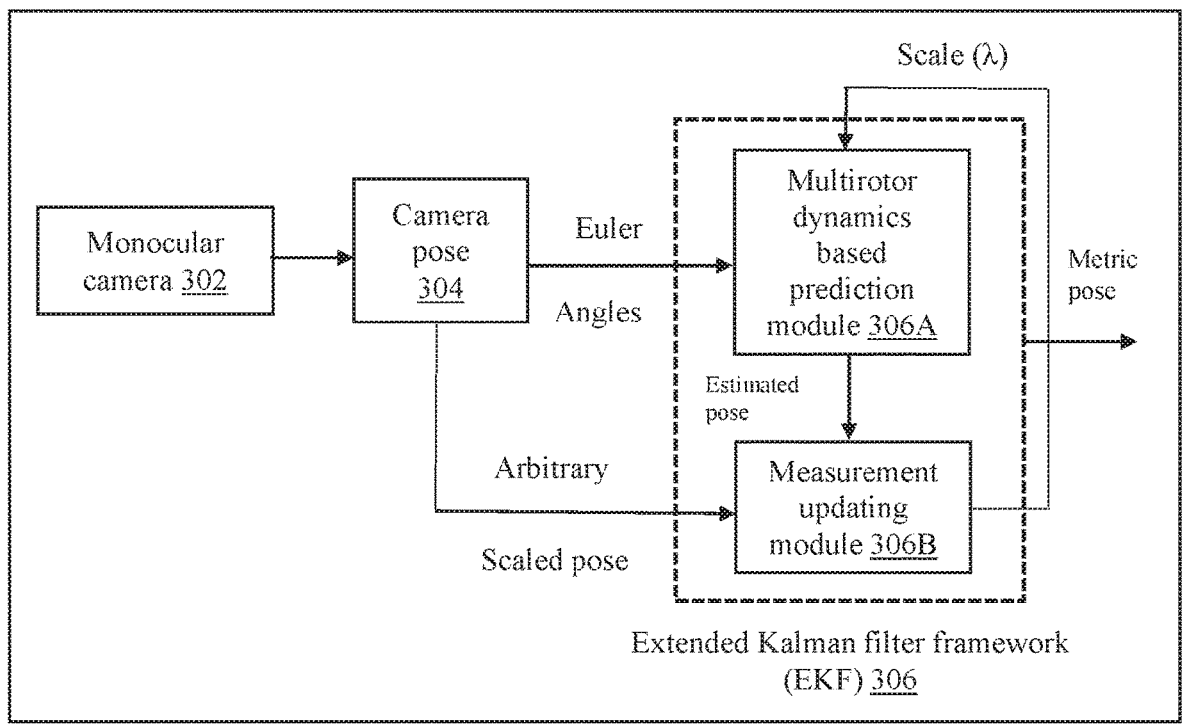
FIG. 3 illustrates an exemplary block diagram of a multirotor system for estimating online scale for a monocular SLAM based on multirotor dynamics in accordance with an embodiment of the present disclosure.

FIG. 3 illustrates an exemplary block diagram of a multirotor system 300 for estimating scale for a monocular SLAM based on the multirotor dynamics in accordance with an embodiment of the present disclosure. The multirotor system 300 includes a monocular camera 302, a camera pose 304, and an extended Kalman filter framework 306. The monocular camera 302 (e.g., VO/V-SLAM) is configured to estimate an arbitrary scaled position of a multirotor based on a vision SLAM (simultaneous localization and mapping) algorithm but not limited to visual odometry in a inertial frame.

The Multirotor dynamics based online scale estimation for monocular SLAM. In an embodiment, this approach computes the drag parameters online in the extended Kalman filter framework (EKF) 306 through vision. As a result, the scale computation now becomes an online process. Further, a theoretical proof for the observability of monocular camera scale is also presented. In an embodiment, the scale observability analysis is presented which shows that the scale of monocular camera becomes observable when multirotor dynamics model is employed, without relying on any other sensor such as an IMU. In an embodiment, the multirotor dynamics are used to define the model for scale estimation and observability analysis.

The extended Kalman filter framework 306 further includes a multirotor dynamics-based prediction module 306A and a measurement update module 306B. The multirotor dynamics-based prediction module 306A is configured to receive an Euler angle estimated from the vision SLAM (simultaneous localization and mapping) algorithm (or technique) to compute an acceleration of the multirotor (or multirotor system). For example, the multirotor (or multirotor system) is a rigid body and thus Newton-Euler equations can be used to describe dynamics. The kinematic and kinetic equations are:

Kinematics:

For example, arbitrary scaled camera pose differs from the metric pose by a scale factor $\lambda$. $\zeta_{C/I}^I$ can be expressed as, $$\zeta_{C/I}^I = \frac{1}{\lambda}(P_{B/I}^I + P_{C/B}^I) \quad (1)$$

$$\text{Or, } \zeta_{C/I}^I = \frac{1}{\lambda}(P_{B/I}^I + R_B^I P_{C/B}^B)$$

Differentiating Equation (1) yields, $$\dot{\zeta}_{C/I}^I = \frac{1}{\lambda}\left(v_B^I + w_{B/I}^B * P_{C/B}^I\right) \quad (2)$$

Also, time rate of evolution of $\eta$ can be expressed as, $$\dot{\eta} = \begin{matrix} \phi \\ \theta \\ \psi \end{matrix} = W(\eta) W_{B/I}^B \quad (3)$$

where $W(\eta) = \begin{bmatrix} 1 & S_\phi T_\theta & C_\phi T_\theta \\ 0 & C_\phi & -S_\phi \\ 0 & S_\phi/C_\theta & C_\phi/C_\theta \end{bmatrix}$ Kinetics:

In the body frame, the force required for the acceleration of mass, $$m\dot{v}_B^B,$$

and the Coriolis force, $$w_B^B * \left(m_q v_B^B\right),$$

are equal to the gravity $(R_B^I)^T g$, thrust force $T_B$, and a rotor drag force $F_D$. Therefore, $$m_q \dot{v}_{B/I}^B + w_{B/I}^B * m_q v_B^B = T_B - F_D + m_q(R_B^I)^T \bar{g} \quad (4)$$

where $$T_B = \begin{bmatrix} 0 \\ 0 \\ T \end{bmatrix}$$

where T is the thrust magnitude. The drag force is approximated by the rotor drag which is directly proportional to the projection of vehicle's translational velocity onto the rotor plane as shown in Equation (5).

$$F_D = K \Sigma_{i=1}^n P_i \Gamma v \quad (5)$$

Here $P_i$ is angular velocity of $i_{th}$ rotor, k is a constant, and $$\Gamma = \begin{bmatrix} 1 & 0 & 0 \\ 0 & 1 & 0 \\ 0 & 0 & 0 \end{bmatrix}$$

Although the drag force is dependent on rotor's angular velocity, given by Equation (5), the summation of rotor's angular velocity is often assumed constant for near hover condition. Here, it is assumed that $\mu_x$ and $\mu_y$ represent the constant lumped drag parameters along body fixed x-y axis respectively such that, $$F_D = \frac{1}{m_q} \begin{bmatrix} \mu_x & 0 & 0 \\ 0 & \mu_y & 0 \\ 0 & 0 & 0 \end{bmatrix} \begin{bmatrix} v_{x_b}^b \\ v_{y_b}^b \\ v_{z_b}^b \end{bmatrix} \quad (6)$$

Further assuming that $\mu_x = \mu_y = \mu$ as assumed. As a result, $F_D$ can be written as, $$F_D = \frac{\mu}{m_q} \Gamma \begin{bmatrix} v_{x_b}^b \\ v_{y_b}^b \\ v_{z_b}^b \end{bmatrix} \quad (7)$$

Ignoring the Coriolis forces in Eqn. 4, time evolution of $v_{x_b}^b$, $v_{y_b}^b$, and $v_{z_b}^b$ can be written as, $$\begin{bmatrix} \dot{v}_{x_b}^b \\ \dot{v}_{y_b}^b \\ \dot{v}_{z_b}^b \end{bmatrix} = \begin{bmatrix} 0 \\ 0 \\ T/m_q \end{bmatrix} - \frac{\mu}{m_q} \Gamma \begin{bmatrix} v_{x_b}^b \\ v_{y_b}^b \\ v_{z_b}^b \end{bmatrix} + g \begin{bmatrix} -S_\phi \\ C_\theta S_\phi \\ C_\theta C_\phi \end{bmatrix} \quad (8)$$

For example, Equation (8) requires that vehicle's parameters $\mu$ and $m_q$ should either be known a priori or computed online. Although $m_q$ is known, $\mu$ is computed online using monocular camera in an EKF framework. The Equation (8) can now be integrated twice to generate the multirotor's pose. Equation (2) and Equation (8) are used to define the system model for observability analysis. The computed acceleration is then rotated to inertial frame, and followed by simple integration (e.g., double integrating) over varying time T, to estimate a metric velocity and a metric position of multirotor in the inertial frame.

In one embodiment, system model includes a propagation model and a measurement model.

Propagation Model:

The complete process model for vehicle's position and attitude subsystem is described in Equation (9). Here, system states are defined as $$X = \begin{bmatrix} \zeta_{C/I}^I & v_B^B & \eta & \lambda & \mu \end{bmatrix} \in R^{11} \text{ such that,} \quad (9)$$

-continued $$\begin{bmatrix} \dot{\zeta}_C^I \\ \dot{v}_B^B \\ \dot{\eta} \\ \dot{\lambda} \\ \dot{\mu} \end{bmatrix} = \begin{bmatrix} \frac{1}{\lambda}\left(R_B^I v_B^B + w_B^B * P_C^I\right) \\ (R_B^I)^T \bar{g} + \frac{1}{m_q} T_B - \frac{\mu}{m_q} \Gamma v_B^B \\ W(\eta) W_B^B \\ 0 \\ 0 \end{bmatrix}$$

Measurement Model:

Monocular VON-SLAM algorithm produces arbitrary scaled position, $\zeta_{C/I}^I$, with WGN $v_\zeta$. Therefore, position measurement, h (.), can be represented as $$h_{\zeta_C} = [h_x, h_y, h_z]^T = \zeta_C^I + v_\zeta \quad (10)$$

Vision sensor measures rotation, $R_C^I$ with an error covariance. Assuming transformation between frames $\{F_C\}$ and $\{F_B\}$ is known, rotation between $\{F_B\}$ and $\{F_I\}$ can be easily computed as $R_B^I = R_C^I R_B^C$. Euler angles, $\eta$, from this rotation is used as attitude measurement for the system with some WGN $v_\eta$ as shown below.

$$h_\eta = [h_\phi, h_\theta, h_\psi]^T = \eta + v_\eta \quad (11)$$

The measurement updating module 306B is configured to compare the estimated metric position with the estimated arbitrary position from the vision SLAM algorithm. In an embodiment, the extended Kalman filter framework 306 through which scale factor $\lambda$, and drag coefficient $\mu$ are determined online.

The multirotor dynamics-based prediction module 306A as:

Example 1

Assuming visual SLAM provides accurate attitude estimation ($\eta$). Further, the scale ($\lambda$) and rotor drag ($\mu$) are observable even when body angular velocities $$\left(w_B^B\right)$$

are unknown, the orientation from vision SLAM is directly used in the prediction model instead of integrating $\eta$ in Equation (3).

Example 2

Assuming that translation between camera frame and body frame is negligible compared to other translational motions.

Example 3

As in Equation (8), $\dot{v}_{z_b}^b$ depends on thrust (i) such that $$\dot{v}_{z_b}^b = \frac{T}{m_q} + g\, C_\theta C_\phi$$

this requires that T should be known but since it is an unknown, and cannot compute $\dot{v}_{z_b}^b$ using this expression. Since, all states, including $\dot{v}_{z_b}^b$ are observable, it implies that information on $\dot{v}_{z_b}^b$ should always be available from measurement. Therefore, as T is unknown, model $\dot{v}_{z_b}^b = 0$ and assume that the resulting error due to this modelling be mitigated by measurement due to $\dot{v}_{z_b}^b$ being observable.

Based on these assumptions, system state can be defined as, $$\vec{z} = [\vec{\zeta}, \vec{v}, \vec{a}, \vec{\lambda}, \vec{\mu}]$$

Where $\zeta \in \mathbb{R}^{3*1}$ is the arbitrary scaled position of the IMU/Camera in the inertial frame, $\upsilon = [v_{x_b}^b, v_{y_b}^b, b_{z_b}^b]^T$ and $a = [\dot{v}_{x_b}^b, \dot{v}_{yb}^b, \dot{v}_{z_b}^b]^T$ are the metric velocity and acceleration of the IMU/Camera in body frame respectively. The discrete form of the non-linear prediction model, for estimation of $\lambda$ and $\mu$ is then given as:

$$\begin{pmatrix} \vec{\zeta}_{k+1} \\ \vec{v}_{k+1} \\ \vec{a}_{K+1} \\ \lambda_{k+1} \\ \mu_{k+1} \end{pmatrix} = \begin{bmatrix} I_3 \frac{t}{\lambda_k} & R_B^I \frac{t^2}{2\lambda_k} & R_B^I & 0_{3*1} & 0_{3*1} \\ 0_3 & I_3 & tI_3 & 0_{3*1} & 0_{3*1} \\ 0_3 & X_{3*3} & Y_{3*3} & 0_{3*1} & 0_{3*1} \\ 0_{1*3} & 0_{1*3} & 0_{1*3} & 1 & 0 \\ 0_{1*3} & 0_{1*3} & 0_{1*3} & 0 & 1 \end{bmatrix} \quad (12)$$

$$\begin{pmatrix} \vec{\zeta}_k \\ \vec{v}_k \\ \vec{a}_K \\ \lambda_k \\ \mu_k \end{pmatrix} + \begin{pmatrix} 0_{3*1} \\ 0_{3*1} \\ -g\sin\theta_k \\ g\sin\phi_k\cos\theta_k \\ 0_{3*1} \end{pmatrix}$$

where $$X = \begin{bmatrix} \frac{-\mu_K}{m_q} & 0 & 0 \\ 0 & \frac{-\mu_K}{m_q} & 0 \\ 0 & 0 & 0 \end{bmatrix}, Y = \begin{bmatrix} 0 & 0 & 0 \\ 0 & 0 & 0 \\ 0 & 0 & 1 \end{bmatrix}$$

and t is the sampling period.

Further, Jacobian of the model is given by, $$F_k = \begin{bmatrix} I_3 \frac{t}{\lambda_k} & R_B^I \frac{t^2}{2\lambda_k} & R_B^I \frac{-t}{\lambda_k^2} & R_B^I \xrightarrow{-t}_{v_k} \frac{-t}{2\lambda_k^2} & R_B^I \xrightarrow{}_{v_k} 0_{3*1} \\ 0_3 & I_3 & tI_3 & 0_{3*1} & 0_{3*1} \\ 0_3 & X_{3*3} & Y_{3*3} & 0_{3*1} & Z_{3*3} \xrightarrow{}_{v_k} \\ 0_{1*3} & 0_{1*3} & 0_{1*3} & 1 & 0 \\ 0_{1*3} & 0_{1*3} & 0_{1*3} & 0 & 1 \end{bmatrix}$$

Where $$Z = \begin{bmatrix} \frac{-1}{m_q} & 0 & 0 \\ 0 & \frac{-1}{m_q} & 0 \\ 0 & 0 & 0 \end{bmatrix}$$

The Measurement updating module 306B is configured to update measurement. The measurement update is given as, $$\vec{y} = H_k \vec{z}_k = [I_3 \ 0_{3*3} \ 0_{3*3} \ 0 \ 0] \vec{z}_k \quad (13)$$

$$K_k = P_k H_k^T (H_k P_k H_k^T + R)^{-1} \quad (14)$$

$$\vec{z}_k = \vec{z}_k + K_k (\vec{x}_M - H_k \vec{z}_k) \quad (15)$$

$\vec{x}_M$ is the arbitrary scaled position obtained from the vision SLAM in the inertial frame. R is the noise covariance matrix for the vision position, $\vec{x}_M$.

A resulting error due to comparison between aforementioned poses is then used to estimate the scale factor and the multirotor dynamics model parameters online. In an embodiment, the scale factor and a parameter associated with the multirotor dynamics model is estimated. For example, parameter associated with the multirotor dynamics model is a drag coefficient.

Figure 4:
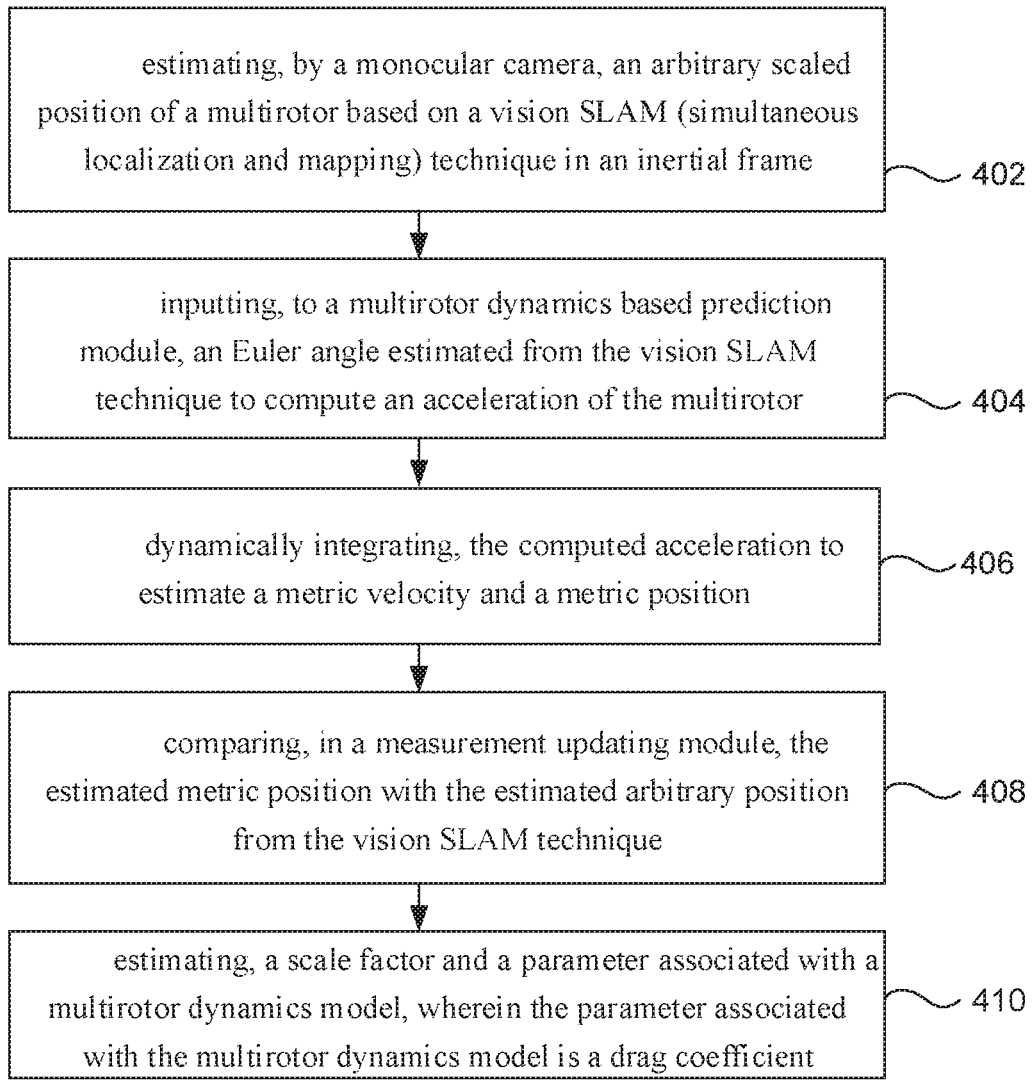
FIG. 4 illustrates an exemplary flow diagram illustrating a method of estimating online scale for a monocular SLAM based on multirotor dynamics of the multirotor system of FIG. 3 according to an embodiment of the present disclosure.

FIG. 4 illustrates an exemplary flow diagram illustrating a method of estimating scale based on multirotor dynamics model of the multirotor system of FIG. 3 according to an embodiment of the present disclosure. In an embodiment, the system 200 comprises one or more data storage devices or the memory 202 operatively coupled to the one or more hardware processors 204 and is configured to store instructions for execution of steps of the method by the one or more processors 204. The flow diagram depicted in FIG. 2 is better understood by way of following explanation/description.

The steps of the method of the present disclosure will now be explained with reference to the components of the system 200 as depicted in FIG. 3, and the flow diagram of FIG. 2. In an embodiment of the present disclosure, at step 402, the one or more hardware processors 204, estimate, by a monocular camera (302), an arbitrary scaled position of a multirotor based on a vision SLAM (simultaneous localization and mapping) technique in an inertial frame. In an embodiment of the present disclosure, at step 404, the one or more hardware processors 204 input, to a multirotor dynamics-based prediction module (306A), an Euler angle estimated from the vision SLAM technique to compute an acceleration of the multirotor. In an embodiment of the present disclosure, at step 406, the one or more hardware processors 204 dynamically integrate, the computed acceleration to estimate a metric velocity and a metric position.

In an embodiment of the present disclosure, at step 408, the one or more hardware processors 204, compare, in a measurement updating module (306B), the estimated metric position with the estimated arbitrary position from the vision SLAM technique. In an embodiment of the present disclosure, at step 410, the one or more hardware processors 204 estimate, a scale factor and a parameter associated with a multirotor dynamics model. In an embodiment, the parameters associated with the multirotor dynamics model is a drag coefficient. In an embodiment, the scale factor is estimated based on a resultant error occurred during comparison between the estimated metric position with the estimated arbitrary position. In an embodiment, the estimated arbitrary scaled position differs from the estimated metric position by the scale factor.

Implementation and Results:

In an exemplary embodiment, the multirotor platform employed for hardware testing is an AR. Drone quadrotor. For example, HD (720p-30 fps) front facing camera feed can be accessed through its driver node. In order to validate the obtained results, true value of vehicle's pose, position and orientation, are required. These are obtained through an optitrack system, which consists of 8 motion capture cameras and provides pose data with accuracy on the order of a millimeter. The velocity and acceleration truth are obtained by sequentially differentiating the position data. The online scale estimation approach has been tested on two different data sets. One is locally produced datasets in our lab and another is Euroc MAV dataset Vicon Room 101. The vehicle was run in a planar lemniscate trajectory for the datasets obtained in our lab. The ORB SLAM algorithm/technique was used to produce arbitrarily scaled poses and to the scale orientation from camera feed for all datasets.

The results obtained on different datasets for online scale estimation using multirotor dynamics.

Local Dataset:

In another exemplary embodiment, the scale estimation results from the proposed approach on the local dataset, i.e., FIG. 6 compares the obtained scale estimate with its true value, computed using the optitrack cameras. Also, the scale estimation method presented is implemented here for better comparison.

Standard Dataset: Euroc Vicon Room 101

Figure 5A:
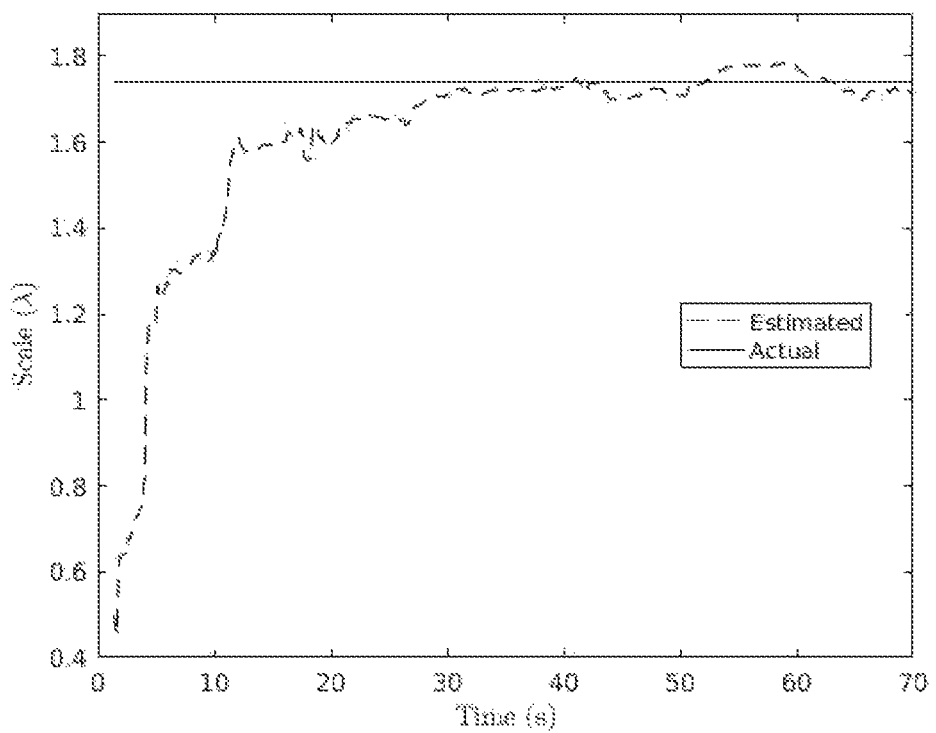
FIGS. 5A, 5B and 5C illustrate an exemplary graphical representation of online scale estimation in accordance with an exemplary embodiment of the present disclosure.
Figure 5B:
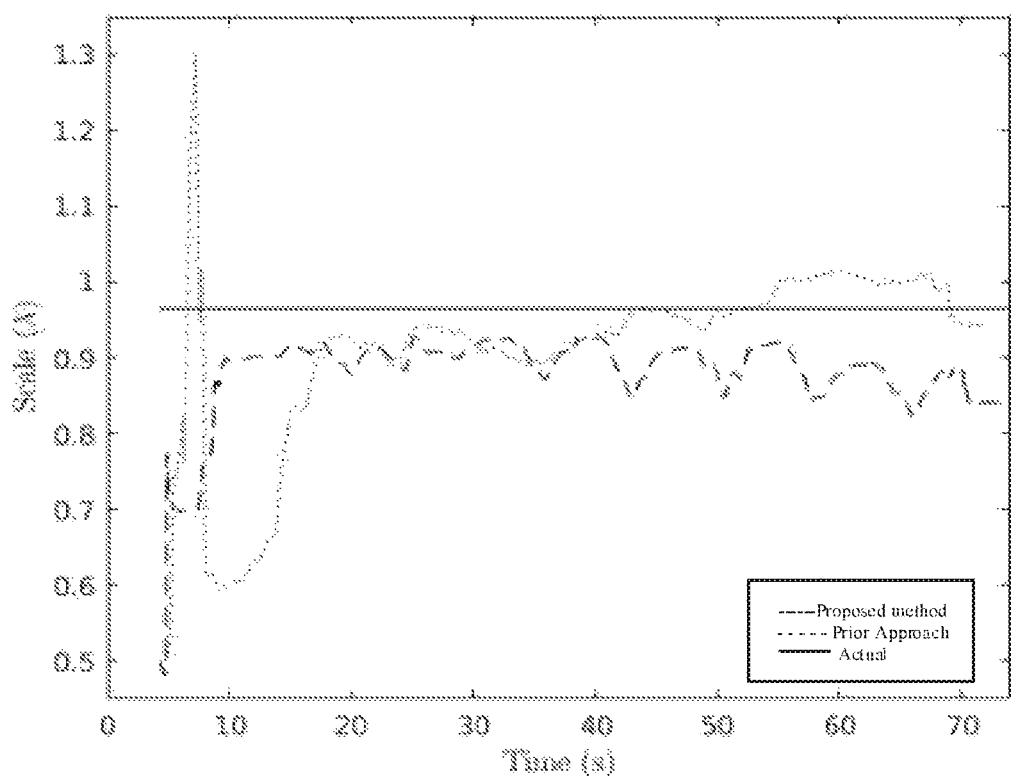
Figure 5C:
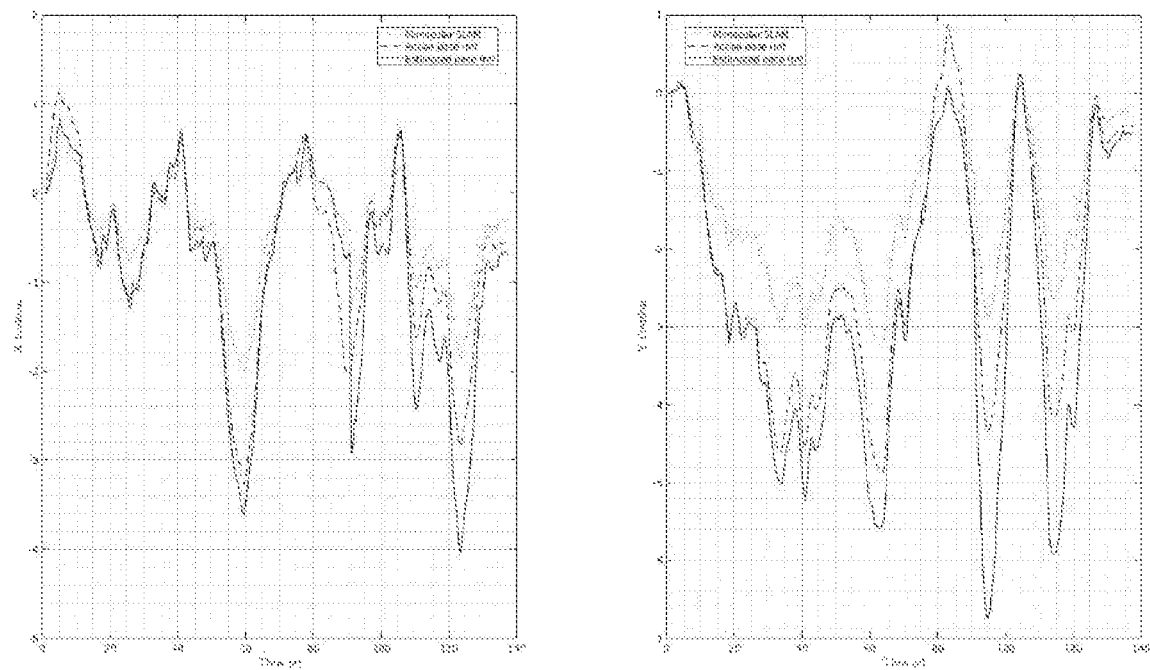

In an exemplary embodiment, implementing the proposed method on the standard Euroc Vicon Room 101 dataset. FIG. 5A compares the estimated scale with its true value. As a result of the scale estimation, the metric pose can now be generated.

TABLE 1

| | |
|---|---|
| Scale convergence time (±10%) | 16 s |
| RMS error in scale after convergence | 0.09 |
| RMS error: Y Pose | 0.3952 m |
| RMS error: X Pose | 0.2949 m |

TABLE 1: The estimated value of scale converges to within ±10% of its true value in about 16 seconds. Table 1 quantifies the proposed method in terms of the RMS error and convergence time obtained on the standard dataset.

This approach provides a method to estimate the scale online solely for monocular SLAM by using the multirotor dynamics model in an extended Kalman filter framework. An interesting approach postulates that scale information can be obtained solely, without any other sensor, from a monocular camera by exploiting the multirotor dynamics model. This approach produces scale estimate solely from monocular camera as long as the Euler angles of multirotor system are known from video feedback.

This is a clear advancement over scale estimation methods which requires information from some other sensors or knowledge of physical dimension of an object within the camera view. Here, utilizes the theory behind multirotor dynamics model and estimates the scale factor online in an EKF framework. Simultaneously, the drag parameters pertaining to the dynamics model is also obtained which facilitates better estimation of scale. Further, the observability of scale and theoretically show that the scale becomes observable when multirotor dynamics model and monocular vision are used in conjunction.

Embodiments of the present disclosure address the unresolved problem of scale ambiguity in monocular SLAM in an online manner. Embodiments of the present disclosure thus facilitate the use of monocular SLAM to produce scaled metric poses without any prior processing such as IMU bias estimation, employed in other state of the art approaches. This approach provides the multirotor dynamics model which can be used to estimate the scale factor (online) through an EKF framework by using the vision sensor only. The effectiveness of the method of the present disclosure was judged based on performance on different datasets. The proposed algorithm/technique estimated the scale factor to be within ±10% of true value as shown in table 1. Thereby, the method works effectively for online scale estimation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including, e.g., any kind of computer like a server or a personal computer, or the like, or any combination thereof.

The device may also include means which could be, e.g., hardware means such as an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method of estimating online scale for a monocular SLAM, comprising:
    estimating, using a monocular camera, an arbitrary scaled position of a multirotor based on a vision SLAM (simultaneous localization and mapping) technique in an inertial frame;
    inputting, to a multirotor dynamics-based predictor, an Euler angle estimated from the vision SLAM technique to compute an acceleration of the multirotor;
    dynamically integrating the computed acceleration to estimate a metric velocity and a metric position;
    comparing the estimated metric position with the estimated arbitrary position from the vision SLAM technique; and
    estimating a scale factor and a parameter associated with a multirotor dynamics model, wherein the parameter associated with the multirotor dynamics model is a drag coefficient.

2. The processor-implemented method of claim 1, wherein the scale factor is estimated based on a resultant error occurred during comparison between the estimated metric position with the estimated arbitrary position.

3. The processor-implemented method of claim 1, wherein the estimated arbitrary scaled position differs from the estimated metric position by the scale factor.

4. A multirotor system comprising:
    a memory storing instructions;
    one or more communication interfaces; and
    one or more hardware processors coupled to the memory via the one or more communication interfaces, wherein the one or more hardware processors are configured by the instructions to:
        estimate, using a monocular camera, an arbitrary scaled position of a multirotor based on a vision SLAM (simultaneous localization and mapping) technique in an inertial frame;

input, to a multirotor dynamics-based predictor, an Euler angle estimated from the vision SLAM technique to compute an acceleration of the multirotor;

dynamically integrate the computed acceleration to estimate a metric velocity and a metric position;

compare the estimated metric position with the estimated arbitrary position from the vision SLAM technique; and estimate a scale factor and a parameter associated with a multirotor dynamics model, wherein the parameter associated with the multirotor dynamics model is a drag coefficient.

5. The multirotor system of claim 4, wherein the scale factor is estimated based on a resultant error occurred during comparison between the estimated metric position with the estimated arbitrary position.

6. The multirotor system of claim 4, wherein the estimated arbitrary scaled position differs from the estimated metric position by the scale factor.

* * * * *